United States Patent Office 3,489,690
Patented Jan. 13, 1970

3,489,690
WATER-IN-OIL EMULSION
Felix Lachampt, Franconville, Andre Viout, Paris, and Guy Vanlerberghe, Mitry-Mory, France, assignors to Societe anonyme dite: L'Oreal
No Drawing. Filed Dec. 13, 1965, Ser. No. 513,560
Claims priority, application Luxembourg, Dec. 17, 1964, 47,604; Nov. 16, 1965, 49,850
Int. Cl. B01j 13/00
U.S. Cl. 252—308     12 Claims

ABSTRACT OF THE DISCLOSURE

Water-in-oil emulsions containing as an emulsifier the compound having the formula $$R-[OC_3H_6]_n-[OC_2H_4]_p-OH$$

in which

R is a linear saturated alkyl comprising from 12 to 20 carbon atoms;

$n$ is a number between 3 and 8 inclusive such that said alcohol, after oxypropylenation but before oxyethylenation, has a melting point below 40° C.; and $p$ is the highest number between 1 and 6 compatible with the production of an alcohol which is insoluble in water.

---

There are a great many cosmetic preparations which may advantageously consist of or comprise water-in-oil emulsions. Unfortunately, in the present state of the art it is difficult to prepare such emulsions which are stable, irreversible, and preferably fluid.

In fact, most emulsions presently known will permit some of the water and oil to escape after a relatively short time. Moreover, it frequently happens that an emulsion which starts out as a water-in-oil emulsion is spontaneously transformed into an oil-in-water emulsion when too much water is added.

The present invention is based on the discovery of emulsifiers which make it possible to easily form stable and irreversible water-in-oil emulsions, which are in most cases highly fluid.

Moreover, the emulsions produced in accordance with the invention are especially valuable for use in the cosmetic field because they ensure a very efficacious hydration of the lipido-proteidic complex which constitutes the corneal layer of the skin and thus prevents drying of that layer.

It appears that this remarkable property of cosmetic emulsions according to the invention may result not only from the particles of water which are retained by the continuous oily phase, but also from the fact that the products making up the emulsion retain a substantial quantity of combined water.

The emulsions according to the invention have the valuable characteristics of facilitating the penetration of the products comprised by the emulsion into the skin.

The object of the present invention is to provide a new article of manufacture which consists of an emulsifier for use in preparing water-in-oil emulsions and characterized by the fact that it comprises at least one oxypropylenated-oxyethylenated alcohol having the formula:

$$R-[OC_3H_6]_n-[OC_2H_4]_p-OH$$

in which:

R is a linear saturated alkyl radical comprising from 12 to 20 and preferably from 16 to 18 carbon atoms;

$n$ is a number high enough so that the oxypropylenated alcohol which is not yet oxyethylenated has a melting point below 40° C., said determination of the number $n$ being made on the alcohol which has undergone oxypropylenation but before the oxyethylenation which must be carried out to produce the emulsifier according to the invention. In general, $n$ will vary between 3 and 8 inclusive and most often from 4 to 6.

$p$ is a number having the highest possible value at which the alcohol is insoluble in water, the value of $p$ lying usually between 1 and 6 and preferably between 2 and 4.

It will be understood that the oxypropylenation and oxyethylenation of the alcohols takes place according to a statistical distribution of the different molecules of alcohol, and that the quantity of oxypropylene and oxyethylene groups in a given specimen result in an emulsifier which may have overall values of $n$ and $p$ which are not whole numbers. It is, however, clear that, on the scale of a single molecule of alcohol, the values of $n$ and $p$ are necessarily whole numbers.

To define the present invention, $n$ is determined by the following formula:

$$n=\frac{56.000-M\times I}{58\times I}$$

in which:

M represents the molecular mass of the fatty alcohol ROH used;

I represents the hydroxyl index of the product obtained by polycondensation of propylene oxide with the fatty alcohol; and $p$ is defined as the number of mols of ethylene oxide fixed by the terminal hydroxyls of the polyoxypropylenated alcohol.

When the value of $p$ in the foregoing formula is so high that the oxypropylenated-oxyethylenated alcohols are soluble in water, these alcohols form emulsifiers of the oil-in-water type, which are very valuable in that they act as conventional nonionic emulsifiers having an unsaturated chain, but without tending to become rancid.

Another object of the invention is to provide those emulsifiers of the oil-in-water type, the emulsions which they form, the cosmetic and pharmaceutical products comprising them, and the methods of preparing them which methods are analogous to those hereinbefore described in the case of those oxypropylenated-oxyethylenated alcohols which are insoluble in water.

A further object of the invention is to provide the new article of manufacture which consists of a "water-in-oil" emulsion characterized by the fact that it contains at least one of the emulsifiers hereinbefore defined.

Yet another object of the invention is to provide a new article of manufacture which consists of a cosmetic product of an excipient for a pharmaceutical product, characterized by the fact that it is in the form of a water-in-oil emulsion and which contains at least one of the emulsifiers hereinbefore described.

The proportion of water in the emulsion of the invention may vary within wide limits, for example, from 20 to 60%, while the proportion of emulsifier varies from about 5 to 25% with respect to the total content, but is at least 10% with respect to the oil.

In accordance with the invention a great many products may be used for the oil phase of the emulsion, for instance:

Hydrocarbon oils, such as paraffin oil, petrolatum, perhydrosqualene, and solutions of microcrystalline wax in paraffin oil;

Animal or vegetable oils such as caballine oil, pork grease, the oil of sweet almonds, and calophyllum oil, which oils are readily absorbed by the skin but may, in certain cases, turn rancid;

Saturated esters which do not turn rancid and which penetrate well, such as isopropyl palmitate, isopropyl myristate, ethyl palmitate, etc.

The oil phase may also comprise silicone oils which are soluble in the other oils.

Suitable additives include long chain fatty alcohols, such as cetyl alcohol, stearyl alcohol, fatty alcohol of beeswax, cholesterol, lanolin alcohol. Magnesium stearate may also be used.

Principally when the emulsions are to serve as cosmetic or pharmaceutical products, it is preferable that the water contained therein be free from electrolytes and other substances in solution.

The emulsions according to the invention make it possible to prepare various cosmetic products, such as hydrating creams, foundation bases, facial make-up, fluid creams, brilliantines, etc.

They also make it possible to prepare excellent medical excipients having great penetrating power.

Another object of the present invention is to provide a method of making oxypropylenated-oxyethylenated alcohols such as those hereinbefore described, which process is characterized by the fact that oxypropylenation is effected by placing the fatty alcohol and propylene oxide under pressure in the presence of a basic catalyst at a temperature between about 110 and 180° C., and preferably about 130–140° C., after which the ethylene oxide is polycondensed with the alcohol at a temperature between about 120° and 180° C., and preferably at about 155° C., using a catalyst such as sodium in the proportion of 0.20 to 0.25% of the weight of the oxypropylenated alcohol, for example. The water-soluble products are then eliminated by washing with water.

As catalyst for the oxypropylenation, one may use alkaline catalyst such as soda or sodium methylate, which may be present in the proportion of from 0.1 to 1% by weight of the alcohol. Concentrations of 0.25% and .4–.5% respectively, appear to give the best results in the cases of sodium and sodium methylate. It is also possible to use for the same purpose acid catalysts such as the Lewis acids, for example, boron fluoride or stannic chloride.

In accordance with the invention, catalysts are usually used in concentrations lying between 0.1 and 1% of the total mass of the reacting material. The reaction is ordinarily carried out at temperatures between 25 and 150° C., either in an autoclave or in a vessel communicating with the atmosphere through a reflux condenser.

In accordance with the invention the oxypropylenated fatty alcohol which is obtaned in a first step may advantageously be purified by elimination of volatile materials under vacuum, or by washing. The final product obtained after reaction with ethylene oxide is washed in water to eliminate water-soluble components.

When, in accordance with the invention, boron fluoride is used as a catalyst in the form of a compound with ether or with acetic acid, it is best to carry out the oxypropylenation at a temperature between about 75 and 100° C., and to carry out the oxyethylenation at a temperature between about 100 and 130° C.

In this case the weight of the boron fluoride used is between 0.2 and 0.5% of that of the total of the reacting components.

In accordance with the invention the boron fluoride may be added either all at one time, or in two distinct parts, one before the introduction of the propylene oxide and the other after the oxyethylenation step has started.

Another object of the present invention is to provide a process for making emulsions from emulsifiers such as those hereinbefore described, said process being essentially characterized by the fact that the mixture comprising the emulsifier and the "oil" part of the formula is heated to 80° C., whereupon the "water" part (which has already been heated to 80° C.) is poured in while the mixture is being vigorously agitated, after which the mixture is cooled while agitation is continued.

In order that the invention may be better understood, several methods of carrying it out will now be described, purely by way of example. The compositions described in the following examples are in each case obtained by preparing the emulsions in the manner already described.

EXAMPLE 1

In order to prepare a polyoxypropylenated fatty alcohol according to the invention, the following constituents are introduced into an autoclave having a capacity of one liter:

230 g. of stearyl alcohol (0.8 mol);
0.9 g. of sodium methylate in powder form;

After which the nitrogen is purged and 408 g. of propylene oxide is added.

The reaction mixture is then heated, while being agitated to 130–135° C. for 16 hours.

After cooling, the product is decanted into a flask and the volatile components are eliminated by heating it on a water bath under vacuum for 15–20 minutes.

After adding 5 cm.³ of hydrochloric acid at 22–23° Bé., the oxypropylenated alcohol is washed successively:

with 1 liter of water at 60° C.
then with 0.5 liter of water at 60° C.
then with 0.5 liter of water at 60° C.

After dehydration under vacuum 548 g. of a light yellow product is obtained, which product has a hydroxyl index of 94 and, using the definition hereinbefore given for the value of $n$, is an alcohol which can be represented by the following formula:

$$C_{18}H_{37}-[OC_3H_6]_{5.3}-OH$$

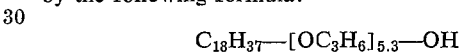

EXAMPLE 2

Under conditions analogous to those which have been described in Example 1 and utilizing as the catalyst 0.25% of soda with respect to the fatty alcohol by weight, starting with one mol of stearylic alcohol and 11 mols of propylene oxide, the process yields an oxypropylenated alcohol having a hydroxyl index of 85 and which may be represented by the formula:

$$C_{18}H_{37}-[OC_3H_6]_{6.4}-OH$$

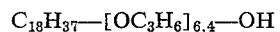

EXAMPLE 3

In order to prepare an oxypropylenated-oxyethylenated fatty alcohol according to the invention, 0.25 g. of sodium is dispersed in 132 g. of alcohol which has been oxypropylenated at 6.4 mols under a nitrogen atmosphere and heated until the sodium dissolves.

The temperature is then increased to 160° C. and the ethylene oxide is introduced through a fritted glass diffuser. The reaction is interrupted when 21 g. of ethylene oxide have been absorbed.

60 grams of the resulting mixture are then withdrawn and 0.5 cm.³ of hydrochloric acid at 22–23° Bé. are added, after which the mixture is washed 3 times with hot water at 80° C.

After vacuum dehydration on a water bath 55 g. of stearylic oxypropylenated-oxyethylenated alcohol are recovered, and, in the manner previously set forth, may be represented by the formula:

$$C_{18}H_{37}-[OC_3H_6]_{6.4}-[OC_2H_4]_{2.4}-OH$$

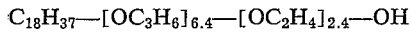

On the other hand the reaction is continued with the 93 g. of the mixture remaining in the apparatus until 9 g. of supplementary ethylene oxide has been absorbed, the temperature being maintained at 160–170° C. during this operation. After neutralization with hydrochloric acid and three washings with 100 cc. of hot water, followed by vacuum drying, an oxypropylenated - oxyethylenated stearylic alcohol is obtained which is represented by the formula:

$$C_{18}H_{37}-[OC_3H_6]_{6.4}-[OC_2H_4]_4-OH$$

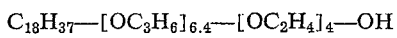

EXAMPLE 4

2.5 ml. of a 36% solution of BF$_3$ in acetic acid is added to 143.5 grams of dehydrated stearylic alcohol which has been heated to 75–80° C.

174 g. of propylene oxide is then added drop by drop, while agitating the mixture and regulating the flow so that the temperature is maintained at that level by the exothermicity of the reaction. This step takes three and a half hours.

After eliminating the volatile materials under a 15–20 mm. Hg vacuum on a boiling water bath, 313.5 g. of a product having a hydroxyl index of 100 mg. KOH/g. is withdrawn. According to the definition hereinbefore set forth for the value of $n$, this product is represented by the following formula:

$$C_{18}H_{37}-[OC_3H_6]_{4.8}-OH$$

0.3 ml. of the acetic solution of BF$_3$ is added to 56 grams of this product. The temperature is increased to 95° C. by heating on a water bath, and the ethylene oxide is introduced through a fritted glass diffuser until the weight of the mixture has been increased by 24 g., while the temperature at the end of the reaction reaches 110° C.

1 g. of 44% potassium hydroxide is added and the mixture washed five successive times with 100 ml. of hot water.

After vacuum drying on a boiling water bath, 59 g. of oxypropylenated-oxyethylenated stearylic alcohol represented by the following formula is withdrawn:

$$C_{18}H_{37}-[OC_3H_6]_{4.8}-[OC_2H_4]_{5.5}-OH$$

EXAMPLE 5

5.7 ml. of a 36% solution of BF$_3$ in acetic acid is added to 243.5 g. of dehydrated cetylic alcohol and heated to 75–80° C.

304 g. of propylene oxide is then added drop by drop, while the mixture is being agitated, and while maintaining the flow so that the temperature is kept constant by the exothermicity of the reaction. This step takes three hours.

5 g. of a 53% soda solution is then added and the mixture heated to 95° C. and agitated for 30 minutes.

It is then washed 4 times with 1 kg. of boiling water. After vacuum drying under 15–20 mm. Hg while being heated on a boiling water bath, 496 g. of a product having a hydroxyl index of 117 mg. KOH/g. is recovered. This product, using the definition of $n$ heretofore given, is represented by the formula:

$$C_{16}H_{33}-[OC_3H_6]_{3.2}-OH$$

1.5 ml. of an acetic solution of BF$_3$ is added to 239 g. of this product. The temperature is increased to 82° C. by heating on a water bath and the ethylene oxide is introduced through a fritted glass diffuser until 104 g. has been added. The temperature reaches 105° C. at the end of the reaction.

3.5 g. f 50% sodium hydroxide is added to the resulting product, which is then washed four successive times with 650 ml. of hot water.

After vacuum drying on a boiling water bath 280 g. of oxypropylenated-oxyethylenated cetylic alcohol is recovered. This alcohol may be represented by the following formula:

$$C_{16}H_{33}-[OC_3H_6]_{3.2}-[OC_2H_4]_{4.2}-OH$$

EXAMPLE 6

A hydrating lotion embodying the invention and having the following composition is prepared.

| | G. |
|---|---|
| Alcohol having the formula: $C_{19}H_{37}-[OC_3H_6]_{6.4}-[OC_2H_4]_2-OH$ | 13 |
| Magnesium stearate | 3.5 |
| Paraffin oil | 33 |
| Perfume | 0.2 |
| Water | 50.3 |

EXAMPLE 7

A hydrating cream according to the invention is prepared, said cream having the following composition.

| | G. |
|---|---|
| Composition having the formula: $C_{18}H_{37}-[OC_3H_6]_{6.4}-[OC_2H_4]_4-OH$ | 8 |
| Petrolatum | 13 |
| Paraffin oil | 12 |
| Stearone | 3 |
| Microcrystalline wax | 3 |
| Beeswax | 1 |
| Perfume | 0.2 |
| Water | 59.8 |

EXAMPLE 8

A hydrating cream according to the invention having the following composition is prepared:

| | G. |
|---|---|
| $C_{18}H_{37}-[OC_3H_6]_{3.4}-[OC_2H_4]_{3.5}-OH$ | 20 |
| Paraffin oil | 16 |
| Stearic acetone sold as "Stearone" by Rhone Poulenc | 2 |
| Microcrystalline wax sold under the trademark Stanolind | 2 |
| Perfume | 0.5 |
| Water | 59.5 |

EXAMPLE 9

A foundation base according to the invention having the following composition may be prepared:

| | G. |
|---|---|
| $C_{18}H_{37}-[OC_3H_6]_{4.8}-[OCH_2CH_2]_{5.5}-OH$ | 8 |
| Paraffin oil | 24.3 |
| Bleached natural ozokerite wax | 3 |
| Lanolin derivative sold under the trademark Super Hartolan by Croda (a wool wax alcohol containing 30% cholesterol) | 3 |
| Extract of lanolin alcohols sold under the trademark Amerchol L101 | 0.2 |
| Polyethylene | 1.5 |
| Pigments | 4.6 |
| Perfume | 0.3 |
| Water | 55.1 |

This tinted foundation base colors the skin while remaining somewhat transparent, and this color does not wash off when water is applied.

EXAMPLE 10

A skin coloring lotion according to the invention and having the following composition may be prepared:

| | G. |
|---|---|
| $C_{18}H_{37}[OC_3H_6]_{6.5}-[OCH_2CH_2]_5-OH$ | 20 |
| Paraffin oil | 15 |
| Microcrystalline wax sold as Aiglowax by Aiglon | 3.35 |
| Lanolin | 1.65 |
| Brown dye sold as Soleil CI4382 by Givaudan | 0.80 |
| Perfume | 0.3 |
| Water | 58.9 |

This product colors the skin and is even more transparent than the foundation base just described. It is quite resistant to water and gives a particularly fresh appearance to the skin.

EXAMPLE 11

A facial make-up for use on the cheeks and having the following composition may be prepared:

| | G. |
|---|---|
| $C_{18}H_{37}-[OC_3H_6]_{6.5}-[OCH_2CH_2]_3-OH$ | 8 |
| Petrolatum | 32 |
| Rouge sold as CI1625 by Huguenin | 0.7 |
| Perfume | 0.5 |
| Water | 58.8 |

This make-up tints the skin, yet is perfectly transparent.

EXAMPLE 12

A leg make-up having the following composition according to the invention may be prepared:

|  | G. |
|---|---|
| $C_{18}H_{37}-[OC_3H_6]_{6.4}-[OC_2H_4]_4-OH$ | 8 |
| Petrolatum | 20 |
| Isopropyl myristate | 8 |
| Titanium oxide | 2 |
| Ochre | 2 |
| Perfume | 0.2 |
| Water | 59.8 |

This leg make-up produces a very uniform flat color which does not come off when it is brushed by clothing.

EXAMPLE 13

A hand cream according to the invention may have the following composition:

|  | G. |
|---|---|
| $CH_{18}H_{37}-[OC_3H_6]_{4.8}-[OCH_2CH_2]_{2.5}-OH$ | 8 |
| Alkyl myristate | 6.4 |
| Paraffin oil | 9.6 |
| Isopropyl lanolate sold as Amerlate P by Amerchol | 1.98 |
| Wax sold as Corhydrol 4–55 by Givaudan | 12.16 |
| Beeswax | 2.56 |
| Titanium oxide | 3 |
| Perfume | 0.5 |
| Water | 55.8 |

This cream not only hydrates the corneal layer of the skin and softens the hands, but also slightly bleaches the skin, even though the titanium oxide will not mark a black tissue.

EXAMPLE 14

An indelible lip rouge having the following composition may be prepared:

|  | G. |
|---|---|
| $C_{18}H_{37}-[OC_3H_6]_{4.8}-[OCH_2CH_2]_{5.5}-OH$ | 10 |
| Eosin | 2 |
| Yellow Carnauba wax | 4.8 |
| Bleached natural ozokerite wax | 19.2 |
| Alkyl myristate | 8 |
| Lanolin | 12 |
| Oleic alcohol | 8 |
| "Ricinocetyl" | 12 |
| Paraffin oil | 16 |
| Water | 8 |

This lip rouge contains a water soluble dye which directly colors the mucous membrane.

This product is much more easily spread over the mucous membrane than other indelible lip rouges.

EXAMPLE 15

A liquid lip rouge having the following composition may be prepared:

|  | G. |
|---|---|
| $C_{18}H_{37}-[OC_3H_6]_{4.8}-[OCH_2CH_2]_{5.5}-OH$ | 10 |
| Paraffin oil | 19 |
| Microcrystalline wax sold as Sidestine IB by Paix | 6 |
| Glycol stearate sold as Monthyle by Gattefosse | 3 |
| Extract of lanolin alcohol sold as Amerchol L101 by Amerchol | 1.2 |
| Eosinate | 1 |
| Perfume | 0.1 |
| Water | 61.7 |

This lip rouge is a water-in-oil emulsion and comprises in solution a water-soluble dye which directly colors the mucous membrane. It leaves the lip bright and hydrates the mucous membrane.

EXAMPLE 16

A cream for treating burns having the following composition may be prepared. This example is given only to show that the emulsions according to the invention are suitable for use as pharmaceutical excipients. The therapeutic constituent of the composition form no part of the invention, since the use of calophyllum oil in treating burns is well known.

|  | G. |
|---|---|
| $C_{18}H_{37}-[OC_3H_6]_{3.4}-[OCH_2CH_2]_5-OH$ | 15 |
| Paraffin oil | 12.2 |
| Microcrystalline wax sold as Aiglowax by Aiglon | 2.8 |
| Calophyllum oil | 2 |
| Water | 68 |

EXAMPLE 17

A fluid cream for adding lustre to men's hair and having the following composition may be prepared:

|  | G. |
|---|---|
| $C_{18}H_{37}-[OC_3H_6]_{4.2}-[OCH_2CH_2]_{4.5}-OH$ | 10 |
| Paraffin oil | 25 |
| Stearic cetone sold as Stearone by Rhone Poulenc | 2.5 |
| Wax sold as Stanolind by Luzzato (a series of petrolatums in a range of shades) | 2.5 |
| Perfume | 0.1 |
| Water | 59.9 |

After application this cream leaves no white trace, keeps the hair in place well and adds lustre to the hair.

EXAMPLE 18

A cream for the bases of the fingernails which has the following composition may be prepared:

|  | G. |
|---|---|
| $C_{18}H_{37}-[OC_3H_6]_{4.2}-[OCH_2CH_2]_{4.5}-OH$ | 15 |
| Perhydrosqualene | 10 |
| Sweet almond oil | 10 |
| Liquid lanolin derivative sold as Lantrol by Malmstrom | 2 |
| Microcrystalline wax sold as Sidestine IB by Paix | 18 |
| Perfume | 0.5 |
| Water | 44.5 |

This cream is very valuable because it hydrates the matrix of the nails.

EXAMPLE 19

A bath oil may be prepared having the following composition:

|  | G. |
|---|---|
| $C_{18}H_{37}-[OC_3H_6]_{4.8}-[OCH_2CH_2]_{5.5}-OH$ | 30 |
| Extract of lanolin alcohol sold as Amerchol L101 by Amerchol | 2 |
| Paraffin oil | 68 |

When this oil is poured into the bath water the body becomes covered with a thick layer of water.

EXAMPLE 20

A sunburn preventing cream having the following composition may be prepared:

|  | G. |
|---|---|
| $C_{18}H_{37}-[OC_3H_6]_{6.5}-[OCH_2CH_2]_2-OH$ | 8 |
| Petrolatum | 30 |
| Purcellin oil, sold by Dragoco | 1.5 |
| Ultra-violet ray filter sold as Parsol by Givaudan | 3 |
| Perfume | 0.2 |
| Water | 57.3 |

EXAMPLE 21

An oily lip rouge having the following composition may be prepared:

|  | G. |
|---|---|
| Carnauba wax | 3 |
| Ozokerite | 19 |
| Acetoglyceride | 5 |
| Lanolin | 15 |
| Lecithin | 3 |
| $C_{18}H_{37}$—$[OC_3H_6]_{4.8}$—$[OCH_2CH_2]_{5.5}$—OH | 10 |
| "Ricinocetyl" | 30 |
| Purcellin oil, sold by Dragoco | 7 |
| Paraffin oil | 8 |
| Pigments and bromo-acids | 5 |

The resulting rouge spreads on well and has an oily lustrous appearance.

EXAMPLE 22

An oily lip rouge having the following composition may be prepared:

|  | G. |
|---|---|
| Carnauba wax | 3 |
| Ozokerite | 19 |
| Acetoglyceride | 5 |
| Lanolin | 15 |
| Lecithin | 3 |
| $C_{16}H_{33}$—$[OC_3H_6]_{3.2}$—$[OC_2H_4]_{4.2}$—OH | 10 |
| Purcellin oil, sold by Dragoco | 7 |
| Mineral oil | 8 |
| Pigments and bromo-acids | 5 |

The resulting rouge spreads well and has a bright oily appearance.

EXAMPLE 23

An anhydrous lip rouge having the following composition may be prepared.

|  | G. |
|---|---|
| Carnauba wax | 3 |
| Ozokerite | 19 |
| Acetoglyceride | 5 |
| Lanolin | 15 |
| Lecithin | 3 |
| $C_{18}H_{37}$—$[OC_3H_6]_{4.8}$—$[OC_2H_4]_{5.5}$—OH | 3 |
| Magnesium salt having the following composition: | |
| $\quad C_{18}H_{37}$—$[OCH_3H_6]_4$—OOC—$CH_2$—COOH | 7 |
| Rincinocetyl | 30 |
| Purcellin oil | 7 |
| Paraffin oil | 8 |
| Pigments | 5 |

EXAMPLE 24

A slightly hydrated lip rouge having the following composition may be prepared.

|  | G. |
|---|---|
| Carnauba wax | 4 |
| Ozokerite | 17.6 |
| Alkyl myristate | 8 |
| Lanolin | 12 |
| Oleic alcohol | 8 |
| Ricinocetyl | 12 |
| Paraffin oil | 18.4 |
| $C_{18}H_{37}$—$[OC_3H_6]_{4.2}$—$[OC_2H_4]_{4.5}$—OH | 5 |
| Eosin | 2 |
| Magnesium salt having the following composition: | |
| $\quad C_{18}H_{37}$—$[OC_3H_6]_8$—OOC—$CH_2$—COOH | 5 |
| Water | 8 |

The emulsions according to the invention are particularly useful in preparing foundation bases, make-ups and hand creams. The titanium oxide and pigments which are well dispersed in these emulsions penetrate the skin remarkably well and cover it without caking.

Moreover, make-ups made in accordance with the invention have the particularly valuable characteristic of being water-resistant and being removable only by using a cleansing cream or lotion.

It will be understood that the particular embodiments of the invention which have been described have been given purely by way of example, and may be modified as to details without thereby departing from the basic principles of the invention.

In particular, it is clear that several emulsions according to the invention may be used in combination with each other and that any of them may be used in combination with emulsions already known to the art.

It also follows that any conventional ingredients, and especially stabilizers, may be introduced into the emulsions according to the invention.

Finally, it will be appreciated that emulsions according to the invention may be used in fields other than the cosmetic and pharmaceutic excipient fields.

What is claimed is:

1. A water-in-oil emulsion consisting essentially of water, oil and an emulsifier consisting essentially of at least one oxypropylenated-oxyethylenated alcohol having the formula:

$$R—[OC_3H_6]_n—[OC_2H_4]_p—OH$$

in which

R is a linear saturated alkyl comprising from 12 to 20 carbon atoms;

$n$ is a number between 3 and 8 inclusive such that said alcohol, after oxypropylenation but before oxyethylenation, has a melting point below 40° C.; and $p$ is the highest number between 1 and 6 compatible with the production of an alcohol which is insoluble in water.

2. An emulsion as claimed in claim 1 in which the proportion of water in the emulsion lies between 20 and 60%.

3. An emulsion as claimed in claim 1 in which the proportion of said emulsifier in the emulsion lies between 5 and 25%.

4. An emulsion as claimed in claim 1 in which the proportion of emulsifier to water is at least 10%.

5. An emulsion as claimed in claim 1 in which said oil is a hydrocarbon oil.

6. An emulsion as claimed in claim 1 in which said oil is animal oil.

7. An emulsion as claimed in claim 1 in which said oil is vegetable oil.

8. An emulsion as claimed in claim 1 which also contains magnesium stearate.

9. An emulsion as claimed in claim 1 which also contains additives to the oil phase at least one substance selected from the group consisting of cetyl alcohol, stearyl alcohol, the fatty alcohol of beeswax, cholesterol, and the fatty alcohol of lanolin.

10. An emulsion as claimed in claim 1 in which $n$ is a number between 4 and 6 inclusive and $p$ is a number between 2 and 4 inclusive.

11. An emulsion as claimed in claim 1, in which said oil is a saturated ester.

12. An emulsion as claimed in claim 1 in which said oil is a silicone oil which is soluble in other oils.

References Cited

UNITED STATES PATENTS

| | | | |
|---|---|---|---|
| 1,970,578 | 8/1934 | Schoeller et al. | 260—98 |
| 2,213,477 | 9/1940 | Steindorff et al. | 252—351 X |
| 2,677,700 | 5/1954 | Jackson et al. | 260—488 |
| 2,841,527 | 7/1958 | Freedman et al. | 167—82 X |
| 2,870,220 | 1/1959 | Carter | 252—351 X |
| 2,960,467 | 11/1960 | Martinek et al. | 252—308 X |
| 3,186,912 | 6/1965 | Beamer | 167—91 |

RICHARD D. LOVERING, Primary Examiner

U.S. Cl. X.R.

252—309, 312, 351; 260—615; 424—59, 61, 63, 64, 170